Dec. 5, 1950 M. G. THEODORACKIS 2,532,864
MEANS FOR PREVENTING THEFT OF CYCLES
Filed Jan. 12, 1948

INVENTOR:
*Manuil George Theodorackis*
BY
*his AGENT.*

Patented Dec. 5, 1950

2,532,864

UNITED STATES PATENT OFFICE 2,532,864

MEANS FOR PREVENTING THEFT OF CYCLES

Manuil George Theodorackis, Johannesburg, Transvaal, Union of South Africa

Application January 12, 1948, Serial No. 1,696
In the Union of South Africa November 16, 1947

1 Claim. (Cl. 70—227)

This invention relates to means for preventing theft of bicycles, motorcycles, tricycles and the like vehicles in which at least one wheel is provided with spokes and is supported between the arms of a fork or like two-armed structure.

The main object of this invention is the provision of a theft-preventing device for vehicles of this type which is safe and reliable in operation, and by means of which the vehicle can be quickly and easily secured and released.

A device according to this invention comprises a first holder suitable to be secured to one arm of the fork; a second holder suitable to be secured to the second arm of the fork opposite the first holder; and a bolt which is arranged to be temporarily secured to both holders, and to project, while so secured, through the wheel so as to arrest rotation of the latter.

In the preferred form of this invention, the means for temporarily securing said bolt to one of said holders comprises adjustable mechanism of the combination lock type.

The bolt is preferably so secured to the first holder that it can be moved from a locking position, in which the bolt projects through the wheel and is locked to the second holder, to an unlocked position, in which said bolt is withdrawn from the second holder and is so held that it cannot interfere with the rotation of the wheel.

For this purpose, the bolt is preferably provided at its one side with a head which engages a slot in the first holder; said slot being so arranged that the bolt can be moved towards the second holder and away from the latter. According to a preferred feature of this invention, the arrangement is such that the bolt, once it is in its "open" position, that is to say, once it is withdrawn from the second holder, can be swung through an angle of about 90° until it is materially parallel with the wheel; and means are provided for firmly holding said bolt in its swung away position until it is again needed for use.

The invention also comprises the combination of a holder suitable to be secured to one arm of the fork of a cycle-frame, with a bolt; said bolt being adjustably secured to said holder; said holder comprising means for guiding said bolt from a "locked" position in which said bolt extends through the cycle wheel so as to arrest rotation of the latter, to an "open" position in which said bolt cannot interfere with the rotation of the wheel; and further means for temporarily securing said bolt in said "open" position.

The invention will be further described with reference to the accompanying drawings, in which.

Figure 1:
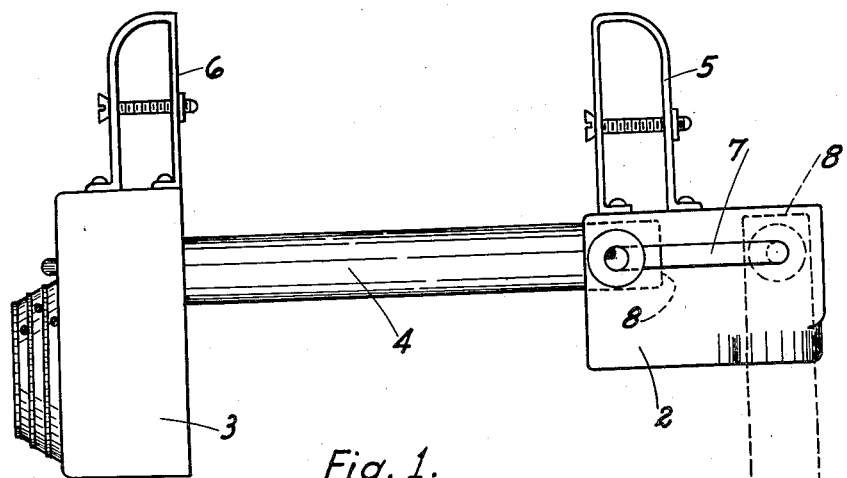
Figure 1 is a plan of one form of the device showing the two holders of the device in those positions in which they will be fixed to a bicycle.

As illustrated in the drawings, the device comprises a first holder 2, a second holder 3 and a bolt 4. The two holders 2 and 3 are arranged to be secured by means of clamps 5 and 6 respectively opposite to one another to the two arms of a fork, between which a bicycle wheel is supported for rotation.

The holder 2 comprises a materially U-shaped body portion which is provided with two slots 7 which are arranged parallel with and facing one another. The head 8 of the bolt 4 engages said slots 7 and is arranged for movement in said holder from a first or locking position, in which said bolt 4 projects through the wheel and is locked to the second holder 3, to an unlocked position in which said bolt is withdrawn from the second holder 3 and is firmly held so that it cannot interfere with the rotation of the wheel.

Figure 3:
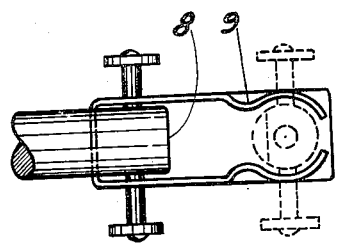
Figure 3 is a front view of the first holder.

Preferably, however, the arrangement is such that said bolt can be swung to a position indicated in chain-dotted lines in Figure 1; in which the bolt is materially parallel with the wheel and completely outside the path of rotation of said wheel. Means of any suitable kind may be provided on said second holder 2 in order to hold said bolt 4 firmly in said unlocked position. In the example, said means consists of a spring clip secured to or forming part of said holder 2, as indicated at 9 in Figure 3.

In the last-described case, the length of the slots 7 need not be substantially greater than is necessary to enable the head of the bolt to be withdrawn from the locking member 3, because said bolt can be swung out of the path of the wheel as soon as it has been so withdrawn from said second holder 3.

When in its locked position, the bolt 4 is secured to the holder 3 preferably by adjustable mechanism of the combination lock type.

Said mechanism comprises, in the example, the combination of several, e. g. 3, recesses 10 on the end 11 of the bolt 4 with a corresponding number of rotatable discs 12, 13, 14, which are arranged in the housing 15 of the second holder 3, and each of which is provided at its periphery with a recess which is big enough to enable said head 11 of the bolt 4 to be withdrawn from the holder 3 when the respective disc is in its "open" position.

The three discs 12, 13, 14 are seated on concentrical pins 16, 17 and 18, respectively, which latter are rotatable independently of one another.

Figure 2:
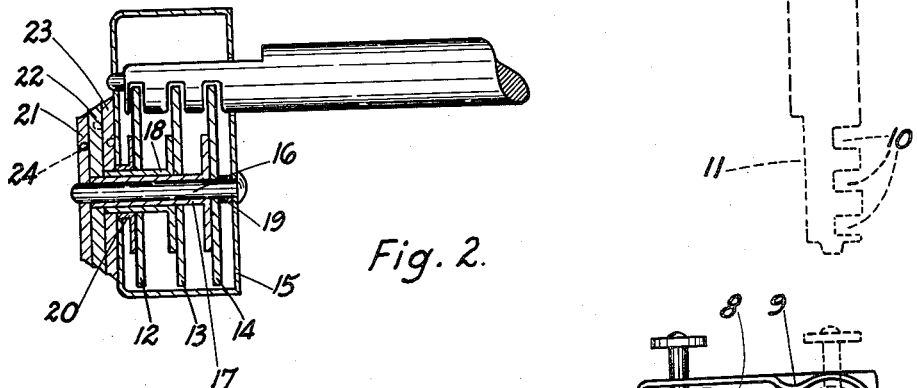
Figure 2 is a section of the second holder.

As shown in Figure 2, the central pin 16 is held at its one end in a bearing 19 which is fixed to the housing 15 while its other end is held in the second, hollow sleeve or pin 17. The last said pin 17 is, in turn, freely rotatable in the third hollow pin or sleeve 18 which has its forward end supported in a bearing 20 which is again secured to the housing 15.

Each of the pins 16, 17, 18 has its one end projecting from said housing 15; and each of said projecting pin ends has secured thereto one of the number discs 21, 22 and 23 respectively.

The discs 21, 22 and 23 are temporarily secured to their respective pins 16, 17, 18, as by set screws 24, so that the angular position of each of said number discs relatively to the recess of its respective lock disc 14, 13, 12 can be easily adjusted, thus enabling an easy change of the lock combination.

The arrangement is such that in a predetermined angular position of the three pins 16, 17, 18 (which position is indicated by that combination of the letters or numerals on the number discs 21, 22, 23 to which the lock is adjusted) the recesses of the three discs 12, 13, 14 are so aligned with one another that the bolt 4 can be withdrawn from said lock member 3 while, when any of the three pins is in an angular position other than that prescribed by the combination to which the lock is adjusted, the rim of its respective disc will engage the respective recess of the bolt 4 and prevent withdrawal of said bolt.

When it is desired to secure the vehicle against theft, the three pins will be adjusted to the prescribed combination; the bolt 4 will be pushed into the member 3; and the angular position of the pins will be changed so that the bolt 4 will be arrested by the rims of the discs 12, 13, 14 engaging in the recesses of the bolt 4. When it is desired to release the vehicle, the pins will be again adjusted to their respective angular positions prescribed by the combination to which the lock is set; and the bolt will be withdrawn from the locking member and will be swung to the position indicated in chain-dotted lines in Figure 1, in which it is firmly held by the formation 9 of the member 2.

I claim:

A device for preventing theft of bicycles, motorcycles, tricycles and the like vehicles in which at least one wheel is provided with spokes and is supported between the arms of a fork or like two-armed structure, said device comprising a first holder adapted to be secured to one arm of the fork; a second holder adapted to be secured to the second arm of the fork opposite the first holder; a bolt which is slidably connected to the first holder and adapted to be temporarily locked to the second holder and to project while so locked through the wheel so as to arrest rotation of the latter; and means for temporarily locking the bolt to said second holder; said first holder comprising a materially U-shaped body portion which is provided with two slots, said slots being arranged parallel with and facing one another; pins in one end of the bolt movable in said slots to mount the bolt in said first holder; said first holder also providing, at that side of the opening of the U which is remote from the second holder, spring-like means to hold the bolt in a position in which said bolt extends materially at right angles to the main extension of said slots; said bolt locking means comprising adjustable mechanism of the combination lock type; said mechanism comprising a number of parallel recesses on the other end of the bolt and a corresponding number of annular, peripherally recessed, discs in the second holder; said discs being secured to and freely rotatable with concentric sleeves; each of said discs being arranged to co-operate with one of said bolt recesses.

MANUIL GEORGE THEODORACKIS.

REFERENCES CITED

The following references are of record in the file of this patent:

UNITED STATES PATENTS

| Number | Name | Date |
| --- | --- | --- |
| 599,143 | Hall | Feb. 15, 1898 |
| 1,402,725 | Pippen | Jan. 3, 1922 |
| 1,967,926 | Dacosta | July 24, 1934 |

FOREIGN PATENTS

| Number | Country | Date |
| --- | --- | --- |
| 102,701 | Great Britain | Dec. 21, 1916 |
| 668,993 | France | July 27, 1929 |